(12) United States Patent
Lundberg et al.

(10) Patent No.: US 6,889,716 B2
(45) Date of Patent: May 10, 2005

(54) FIBER REINFORCED PIPE

(75) Inventors: Chris A. Lundberg, Kingwood, TX (US); David W. McLeod, Cochrane (CA); Samuel Glen Bouey, Calgary (CA)

(73) Assignee: FlexPipe Systems Inc., Calgary (CA)

( * ) Notice: Subject to any disclaimer, the term of this patent is extended or adjusted under 35 U.S.C. 154(b) by 0 days.

(21) Appl. No.: 10/351,350

(22) Filed: Jan. 27, 2003

(65) Prior Publication Data

US 2004/0144440 A1 Jul. 29, 2004

(51) Int. Cl.[7] .............................................. F16L 11/00
(52) U.S. Cl. ...................... 138/130; 138/129; 138/144; 138/124; 138/125
(58) Field of Search ................................. 138/130, 129, 138/127, 125, 126, 132, 133, 172, 174, 144

(56) References Cited

U.S. PATENT DOCUMENTS

| | | | |
|---|---|---|---|
| 2,815,043 A | 12/1957 | Kleiner et al. ............... 138/144 |
| 3,117,597 A | 1/1964 | Fritz et al. ................... 138/125 |
| 3,481,369 A | 12/1969 | Ganahl ........................ 138/144 |
| 3,604,461 A | 9/1971 | Matthews et al. ........... 138/137 |
| 3,948,292 A | 4/1976 | Goto et al. ................... 138/113 |
| 4,023,835 A | * 5/1977 | Ewing et al. ................. 285/235 |
| 4,173,670 A | * 11/1979 | VanAuken .................... 138/123 |
| 4,248,062 A | * 2/1981 | McLain et al. ............... 464/181 |
| 4,273,160 A | 6/1981 | Lowles ......................... 138/124 |
| 4,343,333 A | 8/1982 | Keister ......................... 138/125 |
| 4,384,595 A | 5/1983 | Washkewicz et al. ........ 138/127 |
| 4,431,034 A | 2/1984 | Abdullaev et al. ........... 138/130 |
| 4,515,737 A | 5/1985 | Karino et al. ................. 264/477 |
| RE32,230 E | * 8/1986 | Satoh et al. .................. 138/126 |
| 4,850,395 A | 7/1989 | Briggs .......................... 138/30 |
| 4,898,212 A | 2/1990 | Searfoss et al. .............. 138/130 |
| 5,024,252 A | 6/1991 | Ochsner ....................... 138/130 |
| 5,052,444 A | 10/1991 | Messerly et al. ............. 138/125 |
| 5,261,462 A | * 11/1993 | Wolfe et al. .................. 138/130 |
| 5,316,046 A | 5/1994 | Igarashi et al. .............. 138/136 |
| 5,445,191 A | * 8/1995 | Green et al. ................. 138/126 |
| 6,039,084 A | * 3/2000 | Martucci et al. ............. 138/137 |
| 6,112,771 A | 9/2000 | Aoyagi et al. ............... 138/127 |
| 2002/0054968 A1 | 5/2002 | Hauber ....................... 428/34.4 |
| 2003/0127147 A1 | 7/2003 | Van Dam et al. ........... 138/127 |

FOREIGN PATENT DOCUMENTS

EP                0 969 236 A2     1/2000

OTHER PUBLICATIONS

A G. Gibson, FRC '98, Consolidating New Applications, Seventh International Conference on Reinforced Composites, Conference Proceedings, Apr. 15–17, 1998, University of Houston Libraries.

* cited by examiner

Primary Examiner—Patrick Brinson
(74) Attorney, Agent, or Firm—Bennett Jones LLP

(57) ABSTRACT

A flexible, fiber reinforced pipe has been invented for conveying fluids. The pipe is flexible enough to be spoolable, even under winter temperature conditions. The pipe can contain pressure, when buried, unrestrained and bent. The pipe exhibits impact resistance under normal handling and can be formed using a continuous process, such that it can be manufactured as it is being laid. A flexible, fiber reinforced pipe includes an inner tubular liner having an inner surface and an outer surface; a first layer of reinforcing fibers helically wrapped about the inner liner and in direct contact therewith; an outer layer of reinforcing fibers helically wrapped about an underlying layer of reinforcing fibers and in direct contact therewith; and an outer tubular sheath applied over the outer layer in direct contact therewith.

26 Claims, 2 Drawing Sheets

FIBER REINFORCED PIPE

BACKGROUND OF THE INVENTION

Flexible pipes are needed for conveying fluids under pressure such as sour gas, carbon dioxide and hydrocarbons.

It is desirable that the pipe be spoolable without collapsing or buckling, even in low temperature environments. The pipe must also be capable of containing high pressure flows under conditions of use, such as when buried, unrestrained and bent.

SUMMARY OF THE INVENTION

A flexible, fiber reinforced pipe has been invented for conveying fluids. The pipe is flexible enough to be spoolable, even under winter temperature conditions. The pipe can contain pressure, when buried, unrestrained and bent. The pipe exhibits impact resistance under normal handling and can be formed using a continuous process, such that it can be manufactured as it is being laid.

In accordance with one aspect of the present invention, there is provided a flexible, fiber reinforced pipe comprising: an inner tubular liner having an inner surface and an outer surface; a first layer of reinforcing fibers helically wrapped about the inner liner and in direct contact therewith; an outer layer of reinforcing fibers helically wrapped about an underlying layer of reinforcing fibers and in direct contact therewith; and an outer tubular sheath applied over the outer layer in direct contact therewith.

The underlying layer of reinforcing fibers can be the first layer of reinforcing fibers or intermediate layers of reinforcing fibers applied between the first layer and the outer layer. Where the pipe includes only two layers of reinforcing fibers, the first layer and the outer layer, the outer layer is wrapped in a helical direction opposite (clockwise or counterclockwise) to the first.

Where the pipe includes one or more intermediate layers of reinforcing fibers in addition to the first layer and an outer layer, there must be at least one layer of reinforcing fibers wrapped in a positive helical direction and at least one layer of reinforcing fibers wrapped in an negative helical direction.

DETAILED DESCRIPTION OF THE INVENTION

Figure 1:
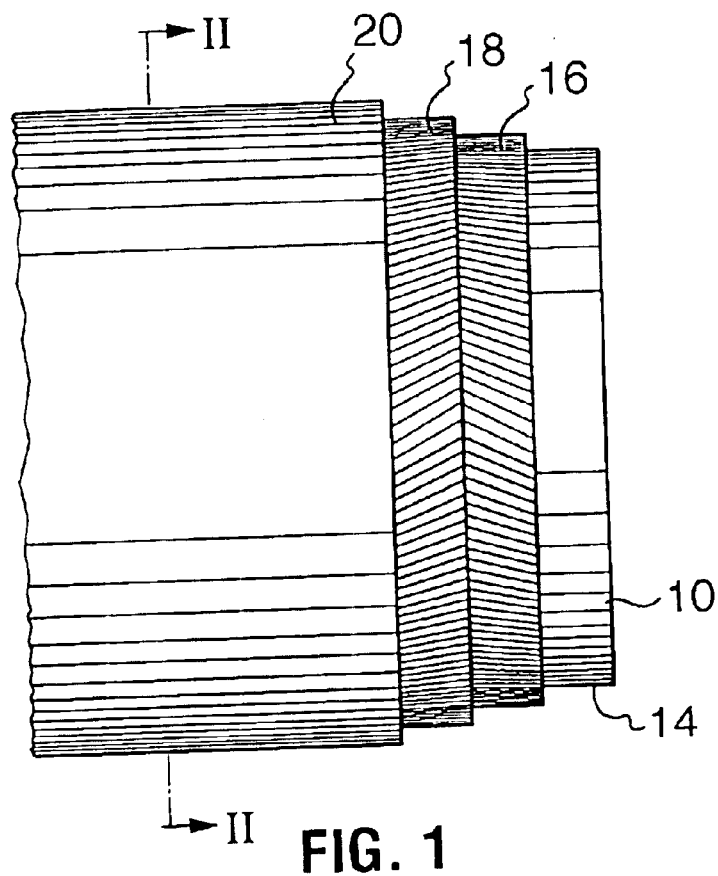
FIG. 1 is a side view, partly broken away in successive layers, of an embodiment of a pipe in accordance with the present invention.
Figure 2:
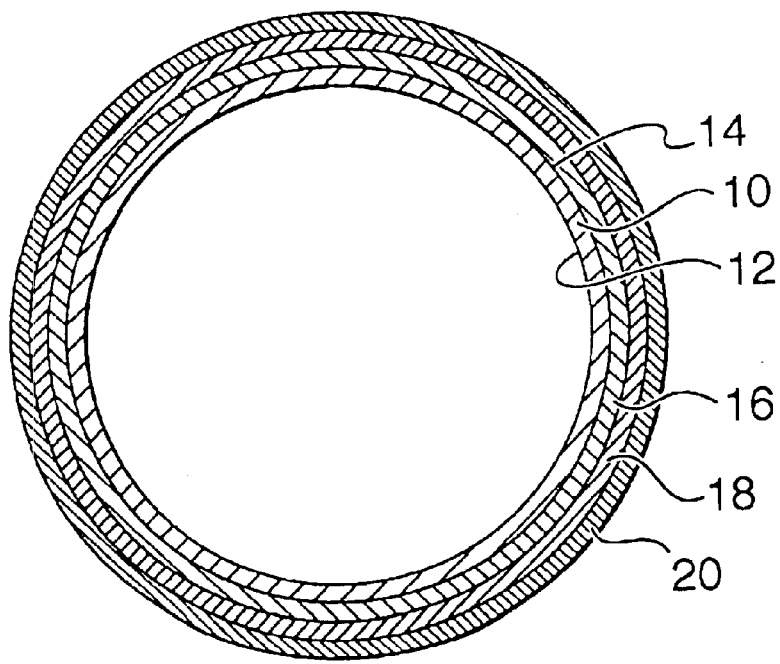
FIG. 2 is a sectional view taken along lines II—II of FIG. 1.

Referring to FIG. 1, a pipe according to the present invention is shown. The pipe includes an inner tubular liner 10 having an inner surface 12 and an outer surface 14, a first layer 16 of reinforcing fibers helically wrapped about the inner liner and in direct contact with the outer surface thereof, a second layer 18 of reinforcing fibers helically wrapped about the first layer of reinforcing fibers in direct contact therewith and an outer sheath 20 applied over the second layer and in direct contact with the second layer of reinforcing fibers. The first layer of reinforcing fibers are wrapped either clockwise or counterclockwise and the second layer is wrapped in the other of the clockwise or counterclockwise direction, when compared to the first layer. Thus, it is said that one layer is wrapped at a positive helical angle and the other layer is wrapped in a negative helical angle.

Inner tubular liner 10 provides little or no-structural support for the pipe. Preferably, the liner is selected to support the loads induced by application of the outer layers about it such as during the winding process and the subsequent extrusion of outer sheath 20. Further, the liner is selected to act as a leak and permeation bladder. The liner should be formed of the most molecularly impervious polymer that meets acceptable material costs, as determined by a cost benefit analysis. Generally, the liner should be selected such that the only leakage is diffusion of gaseous components of the fluid being conveyed. Obviously, the elimination of gaseous diffusion through the liner is preferred. As will be appreciated, the liner is selected to be substantially resistant to degradation by the fluid to be passed therethrough.

The liner is formed of a polymer having bending strains of about 2 to 5 percent such as a thermoplastic or an elastomer. Thermoplastics can include, for example, nylons, cross-linked polyethylene (PEX), polytetrafluroethylene (PTFE), higher temperature engineered polymers or high density polyethylene (HDPE). Elastomers can include, for example, rubbers and nitrites. For petroleum operations, HDPE is particularly useful as it provides good chemical compatibility with many oilfield chemicals at a low cost.

In some embodiments, the liner is filled, for example, with amorphous clays, chopped glass or carbon fibers. These materials can enhance liner stability, for example, against low temperature cracking, against polymer creep for long term integrity and may enhance the initial strength of the liner following extrusion. The fibers can be aligned or random.

Outer sheath 20 surrounds fiber reinforcements 16, 18. While the pipe will function to contain pressurized fluids without the outer sheath, it is useful as it acts to protect the fiber reinforcements from damage, as by abrasion, and assists in stabilizing and holding the fibers in place. The outer sheath can be formed of any flexible material that can protect the fiber reinforcements to some degree. The outer sheath can be, for example, a polymer such as a thermoplastic or a thermoelastomer and can be fiber-filled, if desired. Some useful polymers are, for example, polyethylene or nylon, which are useful for their abrasion resistance as well as their low cost. As will be appreciated with consideration as to the intended use of the pipe, outer sheath 20 can be selected to be substantially resistant to degradation by environmental effects (i.e. ultraviolet light, weather, etc.) and by the chemicals that may come in contact with it.

As desired, the outer sheath can include or have attached thereto identifiers such as, for example, paint, coloration, bar-coding, chips, etc. or materials facilitating use or installation such as, for example, electrically conductive wire or survey locatable metal parts. Where such materials are used however, which can abrade fiber reinforcements, such materials should be spaced or shielded from contact with the fiber reinforcements, as by imbedding or encapsulating within the outer sheath.

In a two layer pipe such as is shown in FIG. 1, layers 16, 18 of fiber reinforcements are configured with one layer wound in a positive or clock-wise helical direction and the other layer wound in a negative or counter-clock-wise helical direction. A layer is one or more substantially continuous reinforcement fiber wound onto the liner or the underlying fiber layer at the same angle and direction. As will be appreciated substantially continuous reinforcements are those of long length, extending along the length of the reinforcement bundle, rather than being formed of chopped or discrete fibers that are matted, woven or otherwise treated to hold them together.

The layers 16, 18 can each be configured in various ways from pipe to pipe and from layer to layer. For example, the layers of fiber reinforcements in any one pipe can vary by the number and arrangement of fibers in a reinforcement bundle (also termed a tow), type of fiber, winding tension, helical angle of winding and/or amount of fibers in any one layer and pipe characteristics can be controlled by selection of these factors.

The fiber layers in the pipe act to react axial and radial loads resulting from, for example, internal pressure and tensile loading. Primary load is in the fiber tensile direction, since generally little side load is induced from operational conditions. Thus, preferred fibers for use in the pipe provide low elongation to failure, for example, of less than 2%. The fibers should also be resistant to degradation by chemicals, such as hydrocarbons and water, intended to be handled, or environmentally present, during use of the pipe. Suitable fibers include glass such as E-glass, E-CR glass or S-glass, carbon, nylon, polyester or aramid. For petroleum operations, E- and E-CR-glass is preferred due to its low cost and ability to carry the required loads. Elongation to failure of glass is generally less than 0.5%.

The use of metal wires which can cause failure, as by abrasion or cutting, of reinforcement fibers should be avoided or should be out of contact with the reinforcement layers.

The fibers in the layers are substantially free floating between liner 14 and sheath 20, being unbonded, as by use of separate adhesives, or curable, cured or uncured polymers, so that the separate fibers, bundles and layers remain independent and can react loads in conjunction with each other, rather than in combination as a rigid body. For example, fibers should be used that are substantially dry such that they will not chemically bond or fuse with other fibers or to the liner or sheath. It is to be noted that the fibers can be untreated, treated or coated and yet considered dry. Each fiber bundle can include one or more individual fibers sometimes twisted together (i.e. in the form of yarn). In one embodiment, a useful fiber bundle contains thousands of individual fibers and is encapsulated with a polymer coating, which does not penetrate the bundle such that the inner fibers remain dry and not chemically bonded or fused together, but are held together as a bundle by the polymer coating. Of course, where fibers are wound onto the liner when it is in the soft or semi-uncured state or the outer sheath 20 is applied by extrusion, as will be described below with respect to a method for producing the pipe, the material of the liner or sheath may mold, and adhere to some degree, to the adjacent fibers. This may reduce the effective free floating characteristics of the inner and outer-most fibers, although the materials of the liner and sheath should preferably be selected to avoid infiltration past the fiber reinforcements which actually come into contact with it. Release agents or other means can be used on the sheath, liner or fibers to reduce adhesion between the fibers and the sheath or liner.

The fibers should be capable of close fitting, thus the use of larger outer diameter fibers, which do not permit close fitting should be avoided. In one embodiment using E-glass fibers, a packing density of 75 to 80% has been found to be desirable. Winding tension effects packing density. A tension force should be used that permits packing of the fiber tows in a manner useful for carrying the required load for the intended application of the pipe. If the fiber tows are not packed sufficiently tight, there will be tightly wound fibers and loosely wound fibers in the pipe. The loose fibers will react loads differently than the tight fibers, so that not all fibers are being employed to carry loads simultaneously. If not all fibers are loaded substantially uniformly, then some fibers may break sooner, as their respective load limits will be reached earlier than the designed optimal limit. In embodiments using fibers with low elongation to failure, such as glass, it is to be understood that the fibers will tend not to stretch to accommodate slack in adjacent fibers. The effects of differential elongation to failure should also be considered when using more than one fiber type in a particular layer. On the other hand, if the fibers are wound with undesirably high tension, fibers will tend to be broken during processing and handling.

The use of tapes is generally not desirable, as close fitting and independent reaction of loads are jeopardized.

The angle of winding of each layer 16, 18 is selected as a compromise on the various loads and conditions to which the product will be exposed during processing and during use with respect to durability and pressure containment, while providing desired flexibility. In the present invention, the prominent condition is internal pressure containment, so the fiber reinforcement needs to be optimized in the radial tensile direction. Other factors that should be considered include installation pull force in the field (axial tensile force) and loads from spooling and unspooling for transport and installation in the field. Key responses of the pipe under load that have to be provided through the winding angles include axial and radial growth of the pipe under the field conditions. Winding angles of between about 8° and 86° can be used. In one embodiment, winding angles of between 40° and 70° are used, with preferred winding angles being between 50° and 60°.

Figure 3:
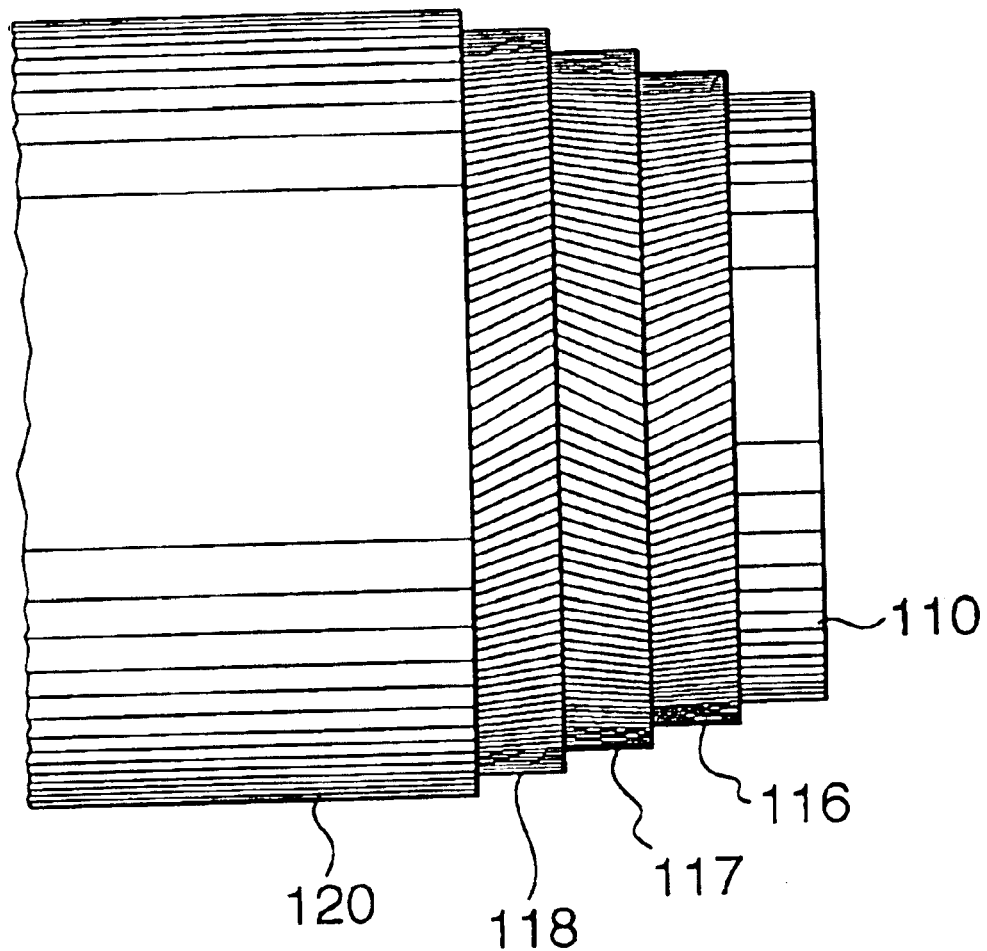
FIG. 3 is a side view, partly broken away in successive layers, of another embodiment of a pipe in accordance with the present invention.

Referring to FIG. 3, there is shown another embodiment of a pipe including an inner tubular membrane 110, a first layer 116 of reinforcing fibers helically wound about the inner liner, an intermediate layer 117 of reinforcing fibers helically wrapped about the first layer of reinforcing fibers, an outer layer 118 of reinforcing fibers helically wrapped about the intermediate layer of reinforcing fibers and a coating 120 applied over outer layer 118.

In the embodiment of FIG. 3, the layers 116, 117, 118 are formed from glass or carbon based fibers or a combination thereof and at least two of the layers are wrapped in opposite helical directions. Adjacent layers can be wrapped in similar directions, but at different angles. This may be useful to reduce fiber abrasion propensity.

Production

With reference to FIG. 1, a pipe in accordance with the present invention can be produced by winding fiber reinforcements about an inner liner 10 to form at least one fiber reinforcement layer 16 wrapped helically in a first direction and at least one fiber reinforcement layer 18 wrapped in an opposite direction. Then a coating 20 is applied over the outer most fiber layer. Preferably, the pipe is produced using a substantially continuous process, wherein long lengths, for example of 0.5 km or more, are produced either just before installing the pipe or for spooling to be used later.

The liner can be formed in any desired way, with consideration as to the, above noted description of the liner. In a preferred embodiment, the liner is produced by extrusion, providing continuous production thereof, of course limited by raw material supply, reel handling size considerations, shipping, etc.

The liner is then wound with continuous fiber reinforcements. The reinforcements are generally wound about outer surface 14 of the liner once it is in the solid state. However, it is possible to apply the fiber reinforcements while the liner is in a molten, semi-molten, uncured or semi-cured state. If the outer surface of the liner is not yet solidified when the fibers are wrapped about it, the first fibers applied over the liner may sink to some degree into the surface of the liner. This can be tolerated, although it is preferred that the fibers not stick at all to the liner and be completely free floating.

One or more reinforcements including fibers of glass, nylon, polyester and/or aramid are wound to form a first layer 16, which is in contact with and covers entirely the outer surface of the liner. In one embodiment, 32 tows each of multiple fibers are wrapped to form a single layer. However, any number of fibers and tows can be used depending on tow fiber count, layer characteristics which are desired to be achieved and equipment capabilities.

Winding can be accomplished by use of a winder that winds one or more fibers in a helical fashion about the liner, as it is being advanced. The fibers are preferably wound at continuous tension levels using, for example, 5 to 10 pounds of pull force for glass. Winding tension may vary from layer to layer to accommodate differences with respect to the fiber material used in that layer. The level of tension force when winding higher elongation fibers is less important than when winding brittle fibers.

In a layer winding process, a few individual terminated fibers in a bundle can be ignored and the free ends will usually be brought back into the bundle as winding continues. A broken fiber which is wound back into the layer recovers its loading capability within a few centimeters. While it is desirable to avoid the use of spliced tows in, or the need to splice tows during production of, a length of pipe, some splices can be accommodated without significant adverse effects on pipe performance. An entire broken tow can be spliced back into the process for continued pipe production by introduction back into the winding process, by use of a stitch or glue. Preferably, however, with consideration as to the length and the wind angle of the pipe to be produced, a tow supply is selected that does to ensure that splices need not be present along the length of the pipe.

Second layer 18 is then wound about, in contact with, the first layer 16. Process considerations as set out above are also applied in the application of the second layer. In one embodiment, the layers are selected to have substantially equal load carrying capability. For example, the first and second layers can have substantially equal but opposite winding angles and fibers applied in substantially equal quantities.

Further fiber reinforcement layers can be wound about second layer 18, as desired, such as is shown in FIG. 3. In addition, other layers can be applied such as coatings, etc. provided that they do not interfere with the ability of the fiber reinforcements to carry load, or otherwise significantly adversely effect the pipe performance.

Sheath 20 is then applied over the second layer 18, as by extrusion, spraying, dipping, tape winding, shrink wrapping, braiding, etc.

The liner is generally selected to support the loads induced by application of the outer layers about it such as during the winding process and the subsequent extrusion of the outer sheath. It is useful to control winding tension to avoid collapse of the liner during the winding process. Sometimes, however it is useful to support the liner to a certain extent during production by, for example, the use of rollers or internal pressure. It is also useful to use rollers or other means to urge the liner into a generally circular cross-section prior to winding to control the cross-sectional shape of the finished pipe.

Performance

For many hydrocarbon handling operations, a pipe having a 3000 psi burst is considered acceptable, a liner bend strain of about 2 to 5% and preferably a maximum of about 3%, and a minimum bend radius of at least 15×times pipe outer diameter is within desired properties. Other performance properties may be desired for other applications.

Example

A pipe was produced in accordance with Table I.

TABLE I

| Production | | |
|---|---|---|
| Inner Liner | | |
| Liner Material | | HDPE |
| Liner OD | in | 3.500 |
| Liner SDR | ratio (OD/t) | 17.0 |
| Liner ID | in | 3.088 |
| Liner wall thickness (t) | in | 0.206 |
| Continuous fiber wrap in two layers | | |
| Fiber Material | | E-glass |
| Wrap angle inner layer | deg. | +55.0 |
| Wrap angle outer layer | deg. | −55.0 |
| Number of yarns per layer | | 32 |
| Thickness per wrap | in | 0.054 |
| Cover | | |
| Cover material | | HDPE |
| Cover thickness | in | 0.100 |
| Cover/pipe OD | in | 3.916 |
| Cover ID | in | 3.716 |
| Cover SDR | | 39.2 |

At design stage, it was desired that the pipe be useful for 750 psi operating pressure. Experiments showed that the pipe burst at about 3,000 psi.

Pipe performance is shown in Table II.

TABLE II

| Performance | | |
|---|---|---|
| Design operating pressure | psi | 750 |
| Burst pressure | psi | 3,000 |
| Fiber stress safety factor | | 4.7 |
| Axial strain | % | 0.3% |
| Radial strain | % | 0.3% |

It will be apparent that many other changes may be made to the illustrative embodiments, while falling within the scope of the invention and it is intended that all such changes be covered by the claims appended hereto.

What is claimed is:

1. A flexible, fiber reinforced pipe comprising: an inner tubular polymeric membrane, a first layer of glass reinforcing fibers helically wound about the inner tubular membrane, an outer layer of glass reinforcing fibers helically wrapped and positioned outwardly of the first layer of reinforcing fibers, the fibers of the outer layer each being independently moveable within the outer layer and an outer coating applied over the outer layer of reinforcing fibers, the first layer of glass reinforcing fibers and the outer layer of glass reinforcing fibers each being substantially free floating between the inner tubular membrane and the outer coating and being separated from contact with any metal reinforcements in the pipe and the pipe including at least one of said layers of glass reinforcing fibers wrapped in a first helical direction and at least one of said layers of glass reinforcing fibers wrapped in a second helical direction opposite to said first direction.

2. The pipe of claim 1 wherein the first layer is wrapped in a first helical direction and the outer layer is wrapped in a second helical direction opposite to said first direction.

3. The pipe of claim 1 wherein the pipe includes at least one intermediate layer of reinforcing fibers disposed between the first layer and the outer layer.

4. The pipe of claim 1 wherein the inner tubular membrane is a thermoplastic or an elastomer.

5. The pipe of claim 1 wherein the outer tubular sheath is a thermoplastic or an elastomer.

6. The pipe of claim 1 wherein the glass reinforcing fibers include E-glass.

7. The pipe of claim 1 wherein the reinforcing fibers are substantially continuous along the first layer and the reinforcing fibers are substantially continuous along the outer layer.

8. The pipe of claim 1 wherein the first and outer layers include substantially equal but opposite winding angles and fibers applied in substantially equal quantities.

9. The pipe of claim 1 wherein the first layer of reinforcing fibers includes substantially continuous and dry fibers and the outer layer of reinforcing fibers includes substantially continuous and dry fibers.

10. The pipe of claim 1, wherein the first layer and the outer layer provide the pipe with controlled radial growth under load and controlled axial growth under load.

11. The pipe of claim 1 wherein the glass reinforcing fibers of the outer layer are each independently moveable within the outer layer by winding the fibers at the same angle and direction throughout the outer layer.

12. The pipe of claim 11 wherein the glass reinforcing fibers are non-woven in the outer layer.

13. The pipe of claim 1 wherein the glass reinforcing fibers of the first layer are each independently moveable within the first layer.

14. The pipe of claim 13 wherein the glass reinforcing fibers of the first layer are each independently moveable within the first layer by winding the fibers at the same angle and direction throughout the first layer.

15. The pipe of claim 14 wherein the glass reinforcing fibers are non-woven in the first layer.

16. The pipe of claim 1 wherein the first layer completely covers the inner tubular membrane and the outer layer completely covers the surface over which the outer layer is applied.

17. The pipe of claim 1 wherein the pipe is devoid of metal reinforcements between the inner membrane and the outer coating.

18. The pipe of claim 1 wherein the pipe is devoid of metal reinforcements.

19. The pipe of claim 1 wherein the glass reinforcing fibers include E-CR glass.

20. The pipe of claim 1 wherein the glass reinforcing fibers include S glass.

21. The pipe of claim 1 wherein the glass reinforcing fibers of the first layer are wound at a pull force of 5 to 10 pounds.

22. The pipe of claim 1 wherein the glass reinforcing fibers of the outer layer are wound at a pull force of 5 to 10 pounds.

23. The pipe of claim 1 wherein the first layer and/or the second layer has a winding angle of between 40° and 70°.

24. The pipe of claim 1 wherein the first layer and/or the second layer has a winding angle of between 50° and 60°.

25. The pipe of claim 1 wherein the outer layer of glass reinforcing fibers is applied over and in direct contact with the first layer of glass reinforcing fibers and the outer coating is applied over and in direct contact with the outer layer of glass reinforcing fibers.

26. The pipe of claim 25 wherein the pipe is devoid of metal reinforcements.

\* \* \* \* \*